Jan. 23, 1968  K. BREDSCHNEIDER ETAL  3,364,767
SIDE-BAR CHAIN
Filed Nov. 10, 1965  3 Sheets-Sheet 3
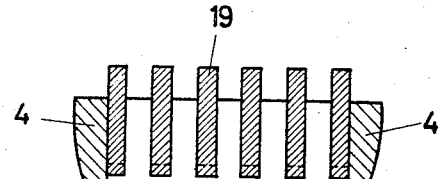
Fig. 14
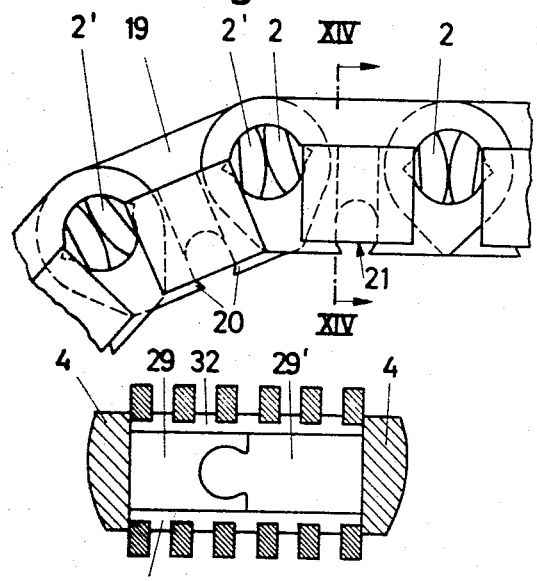
Fig. 13
Fig. 15
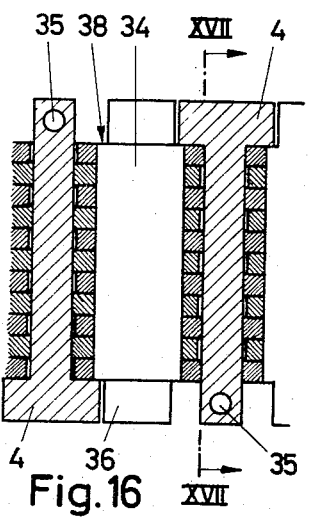
Fig. 16
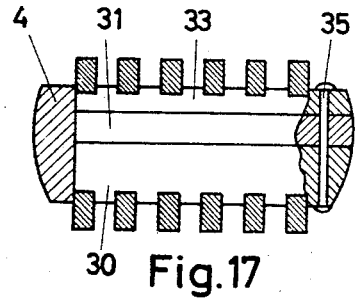
Fig. 17
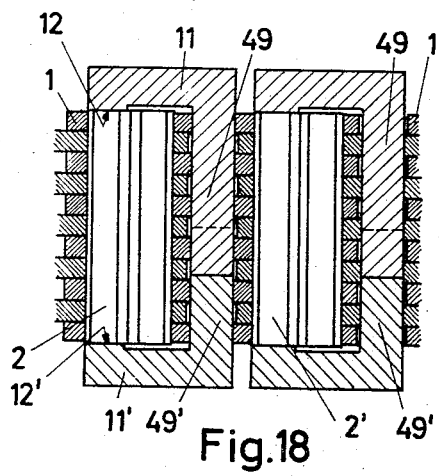
Fig. 18
INVENTORS
Klaus Breidschneider
Eduard Mittersteiner
Karl Zingraf
BY Bailey, Stephens & Huettig
Attorneys

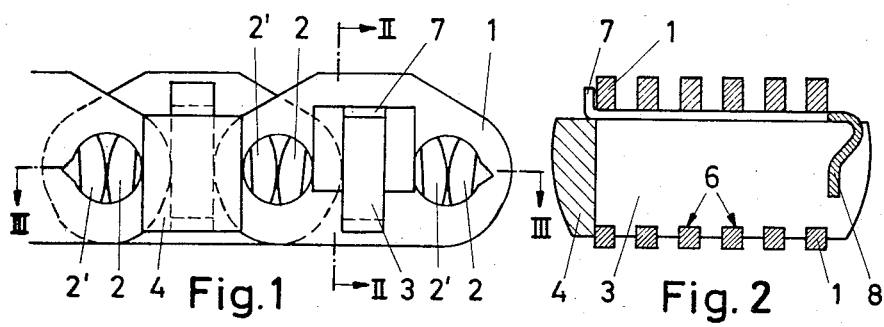
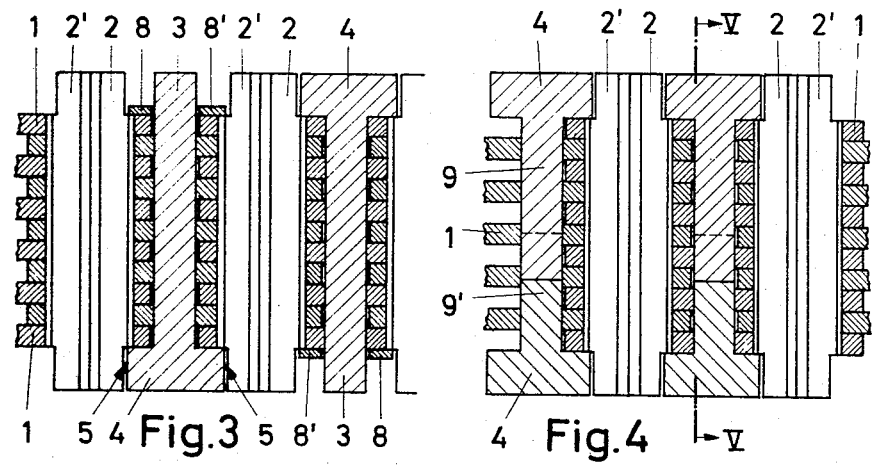
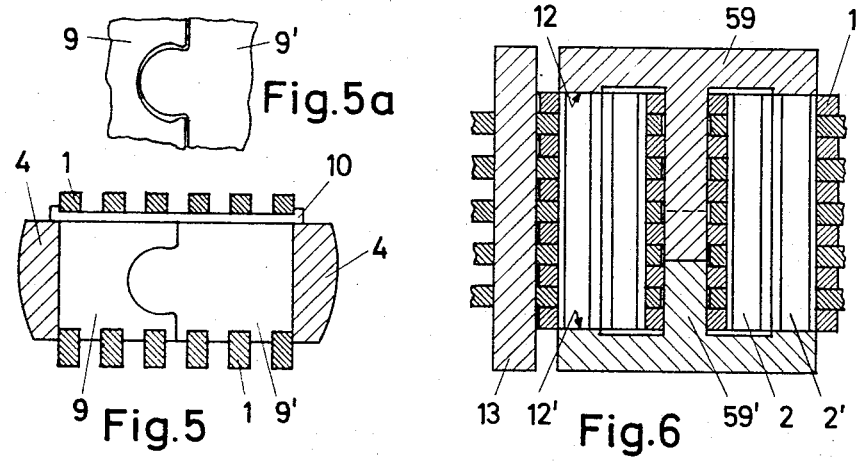

United States Patent Office 3,364,767
Patented Jan. 23, 1968

3,364,767
SIDE-BAR CHAIN
Klaus Bredschneider, Kaiserslautern, Eduard Mittersteiner, Bad Homburg vor de Hohe, and Karl Zingraf, Ansbach, Taunus, Germany, assignors to Reimers Getriebe Kommanditgesellschaft, Ascona, Switzerland
Filed Nov. 10, 1965, Ser. No. 507,189
Claims priority, application Germany, Nov. 25, 1964, R 39,311
20 Claims. (Cl. 74—236)

ABSTRACT OF THE DISCLOSURE

A side-bar chain for an infinitely variable cone pulley transmission is composed of links formed of parallel side bars, link pins connecting sets of side bars and pressure means for transmitting forces between the links and the pulleys. The pressure means combine the side bars in an interlocking position with them. Locking means are provided to maintain the side bars and pressure means in inter-locking relation. Either the locking means or the pressure means secure the pins in position. The pressure means has grooves in which the side bars fit.

The present invention relates to a side-bar chain for an infinitely variable cone pulley transmission which is composed of chain links which are hinged to each other and each of which consists of a plurality of parallel side bars of stamped sheet steel and of pressure members for transmitting frictional forces between the conical pulley disks of the transmission and the chain links.

Aside from such side-bar chains there are other link chains known for the same purpose. Each link of these chains consists of a single piece of material which has a solid central part and connecting bars which are milled out of both ends of this central part and are provided with transverse bores into which the link pins are inserted. These one-piece chain links are, however, extremely expensive because of the large amount of material required and the work involved of milling out the connecting bars. Sidebar chains, on the other hand, in which each link is composed of a set of individual side bars may be produced at a low cost by stamping operations. Since these side bars are merely held together by the link pins, they usually are not sufficiently shear and torsion-resistant which is a considerable disadvantage especially if the transmission in which such a chain is used is subjected to heavy loads since the chain is then acted upon not only by very high tangential forces but, because of the pointlike engagement of the pressure members of the chain links with the conical pulley disks, also by very high torsional forces. Due to the wear within the links, such chains very soon lose their original stability against tangential and torsional forces which, in turn, further increases the wear within the links and further reduces the shear and torsion resistance of the chain which will therefore become useless prematurely. The pressure members of these known types of side-bar chains also cannot increase the stability thereof since they serve for the sole purpose of transmitting the forces which are applied thereon in the direction of traction of the chain. There also are side-bar chains known of a type in which the link pins themselves serve as pressure members. However, since the link pins of such a chain have to have a certain amount of play within the bores of the side bars they cannot improve the stability of the chain.

It has therefore already been proposed to combine the outer side bars of at least some of the links of a chain into a rigid shear and torsion-resistant frame by means of at least one bracketlike crosspiece which passes over the intermediate side bars. Although such a chain possesses an adequate torsion resistance, it requires additional structural elements which increase the cost of its production. Such a chain structure also does not prevent the link pins or even the pressure members from falling out of the chain; especially when the chain is being installed in the transmission or while it is removed therefrom for repairs. Although of course it is possible to provide the heads of the link pins with spring rings or simlar locking means, this not only increases the cost of production of the chain but also those of its assembly and installation.

There is another side-bar chain known for infinitely variable cone pulley transmissions in which the adjacent chain links are connected to each other by so-called rocking pins, each of which consists of a pair of pin-shaped members which aer designed so as to be able to rock on each other, and in which between the outer side bars of each chain link a pressure-transmitting bracing pin is provided which passes through the inner side bars of the link. This chain structure has a good frame stability due to the fact that, when the chain links travel through the conical disks of a transmission, the outer side bars of the links which transmit the frictional forces are firmly pressed against the bracing pins. Such a chain has, however, likewise the disadvantage that the two members of each rocking pin might fall out of the chain, unless they are provided with special securing means which increase the cost of the chain. Furthermore, there is no insurance that the chain will enter properly between the conical disks of each pair since the chain links do not attain their frame stability as described above until they are laterally compressed.

The same conditions as stated above apply in principle to any side-bar chains in which the adjacent links are flexibly connected to each other by means of rocking pins. Such rocking pins have the advantage of a much lower wear than link pins of a circular cross section which are rotatable within the bores in the side bars. Since such rocking pins are preferred for use in high-duty chains, they will also be preferably applied in the chains according to the present invention. However, the invention is not limited to the use of such rocking pins but it is also applicable to chains which are provided with solid link pins.

It is an object of the present invention to provide a chain for an infinitely variable cone pulley transmission which may be manufactured very easily and at a low cost, possesses a very high shear and torsion resistance, and is also fully capable of withstanding the high tensile stresses as well as the high pressures to which the chain is subjected in the direction transverse to its direction of traction. The links of such a chain should also be composed of individual side bars which are stamped out of sheet steel and may therefore be made at a much lower cost than links which have to be milled out of solid blocks of steel. Furthermore, the links of this chain should be provided with pressure members which are adapted to take up the high pressures which are exerted upon the chain transversely to its direction of traction, and which also insure that the frictional forces will be properly transmitted to and by the chain.

According to the invention, these objects will be attained by designing the side bars and pressure members of each link so as to interengage positively with each other, by securing them in this position by a locking element, by combining them by means of link pins so as to form a shear and torsion-resistant chain, and by designing the locking elements and/or the pressure members so as to secure the link pins in fixed positions and thereby to prevent them from shifting relative to the side bars.

The high shear and torsion resistance of the chain according to the invention is attained by the positive interengagement between the side bars which extend in the direction of traction of the chain and the pressure members which extend transversely to the direction of traction. Since the link pins are prevented from falling out of the adjacent chain links either by the additional provision of locking elements or by means of the pressure member which is mounted within each chain link, the danger is completely avoided that the individual parts of the chain might become separated from each other when the chain is being installed or while it is being repaired. One of the most important advantages of such a side-bar chain is also the fact that it may be manufactured very easily and at a low expense since in the most simple case it consists merely of four parts which may be produced by very simple machining operations. The side bars of the chain links and possibly the locking elements as well may simply be stamped out of sheet metal, and the pressure members may be produced by precision casting without requiring any or only very little mechanical finishing. The link pins or the members of the rocking pins may also be produced without difficuties since they usually are made by a drawing process and do not require any additional cutting treatment. The object of the invention of providing a side-bar chain which complies with the highest requirements as stated above and may be produced in a very simple manner and at a low cost is therefore completely fulfilled.

Another feature of the invention consists in dividing the pressure members transversely and by providing the two parts of each pressure member with simple means for interlocking them with each other. If the pressure members are of this type of construction, the locking element may consist of a simple filling strip which merely insures the positive engagement between the pressure member and the side bars of a chain link, whereas the pressure member is prevented from falling out of the link by providing it with a head of a particular shape. If such a transversely divided pressure member is in addition divided in its longitudinal direction, the pressure member may be positively connected to the side bars at two sides thereof so that the chain will then have a still greater frame stability. Instead of interlocking the transversely divided parts of each pressure member with each other, it is also possible to connect them to each other by an adhesive which, however, prevents these parts from being separated in the event that the chain has to be repaired.

A very secure connection between each pressure member and the side bars will be attained if at least one surface of the pressure member which extends in the direction of traction of the chain is provided with comblike recesses into which the side bars of the chain link engage.

In order to prevent the link pins from sliding within the side bars, it has been found advisable to provide each pressure member at least at one end thereof with a hammer head which engages upon a shoulder which is formed between the part of the adjacent link pin which extends through the side bars and an extension of this pin which has a reduced cross section. If the chain is of the type in which each link pin is formed by a pair of rocking members, the hammer head on each pressure member engages into recesses in the two adjacent rocking members at both sides of this head, as seen in the longitudinal direction of the chain. This has the advantage that the link pins or rocking members will not only be held in a fixed position, but that an almost uninterrupted pressure surface is formed along the lateral sides of the chain which considerably improves the transmission of the frictional forces between the conical pulley disks of the transmission and the chain. The same purpose may be achieved by providing each of the two parts of the pressure member of a chain link with an L-shaped part at the inner side facing the side bars with a supporting surface which engages upon the end of the adjacent link pin. If the chain according to the invention is made of this particular construction, only the pressure members which are made of the most suitable shape will come in contact with the conical pulley disks of the transmission. If the adjacent links of the chain are connected to each other by pairs of rocking members, each L-shaped part of the pressure member engages only upon one of the rocking members of one pair and thereby prevents a relative movement between the pressure member and the associated rocking member so that no wear will occur on these parts. In place of such L-shaped pressure members, the two parts of each divided pressure member of each second chain link may also be T-shaped and the crossbar of each of these T-shaped parts may engage upon the ends of the associated link pins or upon the rocking members which are associated with this chain link.

According to another embodiment of the invention, the locking elements as such may be omitted and their function may be carried out by the link pins themselves. The outermost side bars of each chain link are then provided in the form of pressure members which are tightly and irremovably connected to the link pins of this chain link. These pressure members are therefore braced on the link pins so that the pressure will be properly transmitted between the conical pulley disks of the transmission and the individual chain links. Since no relative movements can therefore occur between the link pins and the pressure members, there can also be no wear on these parts.

If the locking member consists of an insert for securing the pressure member in a fixed position within the side bars of a chain link, it has been found very advisable to design this insert so as to be capable of compensating for minor inaccuracies of manufacture of the link by making it of a resilient construction so that the pressure member will always remain in full engagement with the side bars. The locking member may also be provided at one or both sides of the chain with a bifurcated extension which embraces the part of the pressure member which projects from the set of side bars. One arm of the bifurcated extension may then engage upon a shoulder between the link pin and a reduced extension thereof or it may engage into a recess in the rocking member which is directly adjacent thereto. The locking insert thus not only prevents the pressure member from shifting laterally, but it also prevents the associated link pins or rocking members from sliding out of the chain link.

Another feature of the invention consists in providing the locking element in the form of a U-shaped bracket which may be slipped from above over the set of side bars. The two arms of this bracket are provided with corresponding apertures through which the pressure member may be inserted, and these arms engage upon the opposite sides of a shoulder which is formed between the pivot pin and a reduced extension thereof or they engage into recesses in the rocking members which are directly adjacent thereto. In addition, there are means provided for maintaining the pressure member in its fully inserted position within the link. If the chain according to the invention is of this type of construction, the frame stability of its links is attained by the U-shaped bracket which serves as a locking member. A comblike interengagement between the pressure member and the side bars is therefore unnecessary and the pressure member may be made of a more simple shape.

In order to simplify the assembly and installation of the chain, it is advisable to provide the side bars of each chain link with a recess which is open toward the outer side of the chain and permits the pressure member to be inserted therein. The open side of this recess may be covered by a locking strip which may be locked in place when in its proper position. The pressure member of such a link structure may also serve as a means for securing the link pins or rocking members from sliding out of the bores in the side bars since the heads of the pressure members may project so far in the longitudinal direction of the chain at both sides thereof that each head will engage upon the shoulders between the associated link pins and their reduced extensions or into recesses in the rocking members which are directly adjacent to these heads. The only function which the locking element then has to carry out is to prevent the pressure member from being thrown out of the chain link by the centrifugal force occurring during the operation of the transmission. A very secure connection between the pressure member and the side bars of a chain link of this type may be attained by designing these parts so as to fit with a comblike interengagement very deeply into each other. Such a chain may be further improved according to the invention by providing the side bars of each link with corresponding recesses which are open toward the inner side of the chain into which the pressure member may be inserted. It is therefore no longer necessary to provide the locking elements for the purpose of preventing the pressure members from being thrown out of the links by centrifugal force when the chain is running at a high speed, but the centrifugal force will then even insure an especially firm interengagement between the pressure member and the side bars, while the locking element only needs to be provided for the purpose of preventing the pressure member from falling out of the chain link during the assembly and installation of the chain or while the chain is being repaired. The locking element may therefore be of a very weak construction and it may be formed, for example, by upsetting the projecting ends of some of the side bars on the inner side of the chain after the pressure member has been inserted into the recesses in the side bars.

The numerous features and advantages of the present invention will become more clearly apparent from the following detailed description thereof which is to be read with reference to the accompanying drawings, in which—

FIGURE 1 shows a side view of a section of the sidebar chain according to the invention;

FIGURE 2 shows a cross section which is taken along the line II—II of FIGURE 1;

FIGURE 3 shows a longitudinal section which is taken along the line III—III of FIGURE 1;

FIGURE 4 shows a longitudinal section similar to FIGURE 3 of a chain according to FIGURES 1 to 3 which, however, is provided with divided pressure members;

FIGURE 5 shows a cross section which is taken along the line V—V of FIGURE 4;

FIGURE 5a shows a detail view of the interlocking connection of the two parts of a pressure member according to FIGURES 4 and 5;

FIGURE 6 shows a longitudinal section of a chain according to another modification of the invention, in which each chain link is provided with a pressure member which is divided into two T-shaped parts;

FIGURE 13 shows a side view of a section of a chain according to a further modification of the invention, in which the side bars are provided with inwardly facing recesses;

FIGURE 14 shows a cross section which is taken along the line XIV—XIV of FIGURE 13;

FIGURE 15 shows a similar cross section of a chain link in which the pressure member is divided transversely and the opposite sides thereof are provided with comblike recesses;

FIGURE 16 shows a longitudinal section of a chain according to the invention which is provided with solid link pins of a circular cross section;

FIGURE 17 shows a cross section which is taken along the line XVII—XVII of FIGURE 16, but shows another modification of the pressure member; while FIGURE 18 shows a longitudinal section of a chain according to a further modification of the invention in which each pressure member is divided into two L-shaped parts.

Figure 7:
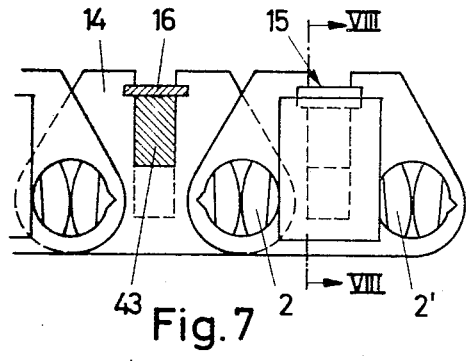
FIGURE 7 shows a side view of a section of a chain according to another modification of the invention, in which the chain links are provided with outwardly open recesses.

As illustrated in FIGURES 1 to 3 of the drawings, the link chain according to the invention essentially consists of individual side bars 1 which are stamped out of sheet steel and extend parallel to each other in the longitudinal direction of the chain, of rocking pins which connect the side bars of the adjacent links to each other, and each of which consists of a pair of rocking members 2 and 2' which are capable of rocking on each other, and of pressure members 3 which extend transversely through the side bars 1. Each of these pressure members 3 is provided on one side with a hammer head 4 which is adapted to engage with a large surface area of one of the conical pulley disks of an infinitely variable cone pulley transmission. This head 4 also engages into recesses 5 in one end of the rocking members 2 and 2' of two adjacent rocking pins so as to prevent these rocking members from falling out of the side bars 1. As illustrated in FIGURE 2, the lower surface of each pressure member 3 is further provided with comblike recesses 6 which extend in the longitudinal direction of the chain link and are adapted to receive the side bars 1 when the chain is being assembled. For securing the pressure member 3 in this position, a strip-shaped locking element 7 is inserted so as to fill out the gap between the side bars 1 and the upper surface of the pressure member 3. A bifurcated extension 8, 8' of locking element 7 embraces the pressure member 3 and engages into recesses 5 in the rocking members 2 and 2' similar to those into which the head 4 of the pressure member 3 engages. Pressure member 3 is thus prevented from yielding upwardly, as seen within the plane of FIGURES 1 and 2, and the side bars 1 fit tightly into its recesses 6 so that the pressure member 3 is firmly clamped. The hammer head 4 on one side of the pressure member 3 and the bifurcated extensions 8, 8' of the locking element 7 on the opposite side of the pressure member prevent the rocking members 2 and 2' from falling out of the bores in the side bars 1. It is evident from this description that the chain according to FIGURES 1 to 3 will be very resistant to shear and torsion and that its various parts may be produced very easily and at a low cost and may also be very easily assembled, and that the chain cannot fall apart when being installed in a transmission or while being repaired.

FIGURE 4 illustrates a modification of the chain according to FIGURES 1 to 3. The pressure members of this chain are provided with hammer heads 4 on both sides which requires each pressure member to be divided into two parts 9 and 9' in order to permit it to be installed in the side bars 1. For preventing these two parts 9 and 9' of each pressure member from coming apart and falling out of the side bars 1, which would result in a separation of the chain into two strands, their inner ends are designed so as to interlock with each other in the manner as illustrated in FIGURES 5 and 5a. Since both parts 9 and 9' of each pressure member are provided with hammer heads 4, the bifurcated extension 8, 8' of the locking element may be omitted. This locking element 10 which may be inserted so as to fill out the gap between the side bars 1 and the upper side of the pressure member will also prevent the two parts 9 and 9' of the pressure member from being separated unintentionally. Locking element 10 may for this purpose be provided with small corrugations so as to have a spring action within the plane of the direction of traction of the chain and thereby to press the two parts 9 and 9' of the pressure member firmly against the side bars 1. In order to prevent the locking element 10 from falling out of the gap between the side bars 1 and the pressure member 9, 9', it may be bent at both ends against the outer side bars 1.

According to another modification of the invention as illustrated in FIGURE 18, each of the two parts 49 and 49' of each pressure member is L-shaped and both parts interlock with each other similarly as shown in FIGURE 5a. The longitudinal arms 11 and 11' of the two L-shaped parts are provided at their outer ends with supporting surfaces 12 and 12' which face the side bars 1 and engage with the ends of the rocking members 2 or 2'. The forces which are exerted upon the pressure members are in this manner also taken up by the rocking members 2 and 2'. In order to prevent any relative movements and wear between the arms 11 and 11' of the two parts 49 and 49' of the pressure member of each chain link and the rocking member 2 or 2' which is associated with this link, the supporting surfaces 12 and 12' only engage upon this particular rocking member. The same applies to the link structure according to FIGURE 6 in which the two parts 59 and 59' of each pressure member are T-shaped and interlocked with each other in the same manner as shown in FIGURE 5a and the corresponding outer arms of both parts 59 and 59' are provided with supporting surfaces 12 and 12' which engage only with the ends of those rocking members 2 or 2' which are associated with the particular link containing the interlocked arms of the parts 59 and 59'. The next chain link following a link with a double T-shaped pressure member of the type as shown in FIGURE 6 is provided with a simple straight continuous pressure member 13 which may be secured by a locking element 10 similar to that as shown in FIGURE 5.

Figure 8:
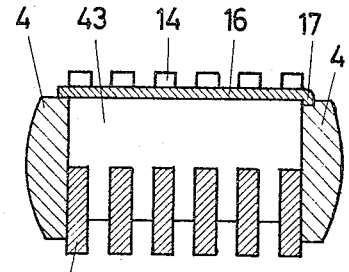
FIGURE 8 shows a cross section which is taken along the line VIII—VIII of FIGURE 7.
Figure 8A:
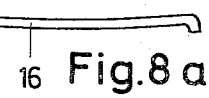
FIGURE 8a shows a detail view of a resilient locking strip for a chain link according to FIGURES 7 and 8.

FIGURES 7 and 8 illustrate another modification of the chain according to the invention in which the side bars 14 of the links are provided with deep cuts 15 which are open toward the outer side of the chain and are adapted to receive the pressure members 43. These pressure members are likewise provided with hammer heads 4 which engage into recesses in the adajacent rocking members in the manner as described with reference to FIGURES 1 to 4 and thus retain these rocking members in a fixed position. The pressure members 43 are also in a comblike interengagement with the side bars 14 and are locked in this position by a resilient locking strip 16, as separately shown in FIGURE 8a, the hook-shaped end 17 of which is adapted to snap into a corresponding recess in the pressure member 43. This chain structure has the advantage of having a very high resistance to torsion since the pressure member 43 engages deeply into the side bars 14. The same applies to the chain structure according to FIGURES 13 and 14, in which, however, the deep cuts 21 are open toward the inner side of the chain. During the operation of the chain, the pressure members 18 will be forced outwardly by centrifugal force which has the advantage that the chain links do not have to be provided with locking strips and that the pressure member 18 which is likewise provided with hammer heads 4 may be securely held in a fixed position within the side bars 19 merely by slightly upsetting one or more side bars 19, as indicated at 20 in FIGURES 13 and 14.

Figure 9:
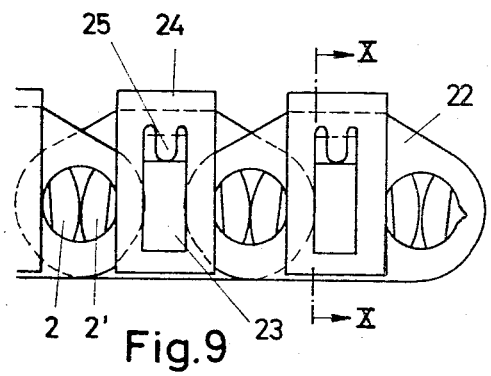
FIGURE 9 shows a side view of a section of a sidebar chain according to another modification of the invention which a U-shaped bracket is slipped over each chain link.
Figure 10:
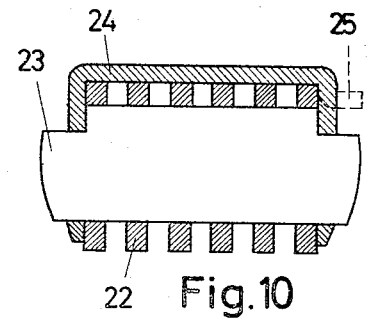
FIGURE 10 shows a cross section which is taken along the line X—X of FIGURE 9.

FIGURES 9 and 10 illustrate a further modification of the chain according to the invention, in which a U-shaped bracket 24 is slipped from above over the set of side bars 22 of each chain link. The two arms of this bracket 24 have corresponding apertures through which a pressure member 23 may be inserted. When this has been done, a lug 25 at one end of the bracket 24 is bent over so as to close the remaining open part of the aperture and thereby to secure the U-shaped bracket in the position as illustrated. The two arms of bracket 24 further engage into the adjacent rocking members 2 and 2' and thereby prevent the latter from sliding out of the bores in the side bars 22. The principal purpose of the U-shaped bracket 24 is to insure that the chain link over which it is applied has an adequate frame stability.

Figure 11:
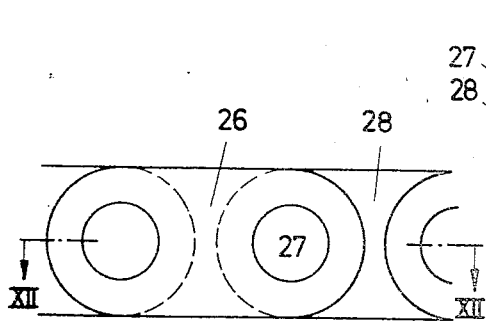
FIGURE 11 shows a side view of a section of a chain according to another modification of the invention in which the chain links are provided with strong outer side bars serving as pressure members.
Figure 12:
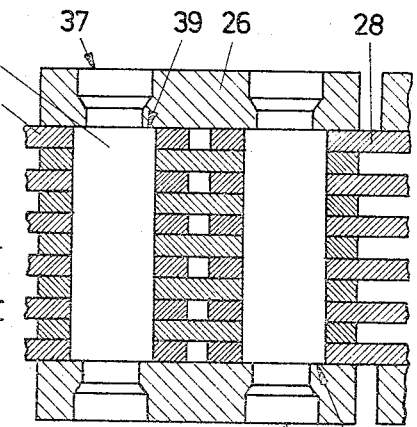
FIGURE 12 shows a longitudinal section which is taken along the line XII—XII of FIGURE 11.

According to the further modifications of the invention as illustrated in FIGURES 11 and 12, the two outer side bars 26 are designed so as also to serve as pressure members and are firmly secured to link pins 27, for example, by riveting at 37 or by other suitable locking means so as not to be removable therefrom. When a chain of this type of construction is wedged between the conical disks of a cone pulley transmission, the pressure members 26 which are acted upon by the conical disks are braced on shoulders 39 on link pins 27 which are in alignment with the outer surfaces of the two outermost side bars 28.

FIGURES 15 to 17 illustrate another modification of the chain according to the invention which has a very high frame stability. The two parts 29 and 29' of each pressure member according to FIGURE 15 interlock with each other in the same manner as shown in FIGURE 5, but in addition they are divided in the longitudinal direction so as to form separate inserts 32 which are provided with comblike recesses into which the side bars of the chain link engage. Since the hammer heads 4 on the two parts 29 and 29' engage upon the end surfaces of these inserts 32, the latter also support these hammer heads against transverse shearing forces. When the chain is being assembled, the inserts 32 are at first inserted into the side bars near the upper and lower sides thereof and thereafter the pressure members 29 and 29' are inserted from the opposite lateral sides and interlocked with each other at the center of the link.

FIGURES 16 and 17 show a modification of the chain structure according to FIGURE 15, in which the side bars are connected by solid link pins. A pressure member 30 and a separate insert 33 are both provided with comblike recesses so that these two parts may engage into the side bars of the chain link near the upper and lower sides thereof. Thereafter a further pressure member 34 is inserted between the two parts 30 and 33 and secured thereto by a locking member 35 so as to prevent it from sliding laterally out of the side bars. Link pin 34 has an extension 36 of a smaller cross section on each end so that the total length of each link pin is equal to the length of the pressure members. The hammer head 4 on each pressure member 31 of adjacent chain links engages from one side or the other upon the shoulder 38 which is formed between the intermediate link pin 34 and one of its extensions 36, so that the link pins are prevented from sliding out of the bores in the side bars. The assembly of such a chain link is carried out in the same manner as that of a link according to FIGURE 15 by first inserting the pressure member 30 and the insert 33 into the side bars of the link, by then inserting the pressure member 31 between the two members 30 and 33, and by finally securing all three members together by the locking member 35.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. In a side-bar chain for an infinitely variable cone pulley transmission having chain links each comprising a plurality of side bars, link pins extending transversely through and pivotably connecting the adjacent chain links to each other, and pressure means on each of said links for transmitting frictional forces between the conical pulley disks of said transmission and said chain links, the improvement according to which said pressure means of each of said chain links combine said side bars of said chain links in an inter-locking position with said pressure means, and further comprising locking means for maintaining said side bars and pressure means in said interlocking position thereby forming one chain link of a shear and torsion-resistant chain, at least one of said locking means and said pressure means of a link also securing said link pins in a fixed position so as not to be slidable relative to said side bars.

2. A side-bar chain as defined in claim 1, in which said pressure means comprise a pressure member extending transversely through said side bars and being divided at least into two parts, and means for locking said parts together.

3. A side-bar chain as defined in claim 1, in which said pressure means comprise a pressure member extending transversely through said side bars and being divided in its longitudinal direction into at least two parts, and means for locking said parts together.

4. A side-bar chain as defined in claim 1, in which said pressure means comprise a pressure member extending transversely through said side bars and having at least one surface with comblike recesses therein extending in the longitudinal direction of said chain link, said side bars engaging into said recesses and fitting tightly against the walls thereof.

5. A side-bar chain as defined in claim 1, in which said pressure means comprise a pressure member extending transversely through said side bars and having a hammer head at least on one end thereof, each of said link pins having an extension of a smaller cross section on at least one end thereof projecting from said side bars so as to form a shoulder between said link pin and said extension, said hammer head engaging upon said shoulder so as to lock said link pin in a fixed position relative to said pressure member and said side bars.

6. A side-bar chain as defined in claim 1, in which said pressure means comprise a pressure member extending transversely through said side bars and having a hammer head at least on one end thereof, each of said link pins being longitudinally divided and forming a pair of rocking members adapted to rock on each other and each having a recess in at least one end thereof, said hammer head engaging into said recess of a first of said rocking members which is spaced at a smaller distance than the second rocking member from said pressure member so as to lock said first rocking member in a fixed position relative to said pressure member and said side bars.

7. A side-bar chain as defined in claim 1, in which said pressure means of each chain link are formed by the two outermost side bars of said link, said locking means being formed by the ends of said link pins and being secured to said outermost side bars so as to prevent said link pins from sliding relative to all of said side bars of said chain link.

8. A side-bar chain as defined in claim 1, in which said locking means comprise a substantially U-shaped bracket adapted to be fitted from above over the set of said side plates of one chain link and having two arms with a corresponding aperture in each of said arms, said pressure means comprising a pressure member extending transversely through said side bars and through said apertures in said bracket arms, each of said link pins having an extension of a smaller cross section on each end thereof projecting from said side bars so as to form a shoulder between said link pin and said extension, each of said arms of said bracket being adapted to engage resiliently upon said shoulders of said two link pins.

9. A side-bar chain as defined in claim 1, in which said locking means comprise a substantially U-shaped bracket adapted to be fitted from above over the set of said side plates of one chain link and having two arms with a corresponding aperture in each of said arms, said pressure means comprising a pressure member extending transversely through said side bars and through said apertures in said bracket arms, each of said link pins being longitudinally divided and forming a pair of rocking members adapted to rock on each other and each having a recess in each end thereof, each of said arms of said bracket being adapted to engage into said recesses of the two rocking members of said two link pins which are located at a smaller distance from said pressure member than the two other rocking members, and means for securing said pressure member in its inserted position.

10. A side bar chain as defined in claim 1, in which the set of said side bars of each link has a recess in the side thereof forming a part of the outer side of said chain, said pressure means comprising a pressure member adapted to be inserted into said recess and to engage with the walls thereof, said locking means comprising a striplike member adapted to close said recess above said pressure member and to press resiliently upon said pressure member, and means for locking said striplike member in a fixed position to said chain link.

11. A side-bar chain as defined in claim 1, in which the set of said side bars of each link has a recess in the side thereof forming a part of the inner side of said chain, said pressure means comprising a pressure member adapted to be inserted into said recess and to engage with the walls thereof and to be pressed by centrifugal force against the bottom of said recess when said chain is in operation, said locking means being adapted to maintain said pressure member in said recess.

12. A side-bar chain as defined in claim 1, in which said pressure means comprise a pressure member extending transversely through said side bars and being divided transversely thereof into two parts, and means on the ends of said parts facing each other for locking said parts together.

13. A side-bar chain as defined in claim 12, in which each of said two parts of said pressure member is substantially L-shaped, one of the arms of each of said L-shaped parts being adapted to be locked by said locking means to the corresponding arm of the other L-shaped part, the free end of the other arm of each L-shaped part having a supporting surface facing said side bars, said supporting surface engaging upon one of said link pins and thereby locking the same in a fixed position relative to said pressure member and said side bars.

14. A side-bar chain as defined in claim 13, in which each of said link pins is longitudinally divided and forms a pair of rocking members adapted to rock on each other, said supporting surface on each of said L-shaped parts engaging only upon a first of said two rocking members which is spaced at a greater distance than the second rocking member from the arms of said L-shaped parts which are adapted to be locked together so as to lock said first rocking member in a fixed position relative to said pressure member and said side bars.

15. A side-bar chain as defined in claim 12, in which each of said two parts of said pressure member of each second chain link of said chain is substantially T-shaped, the free ends of the central arms of said T-shaped parts being adapted to be locked together by said locking means, the two free ends of the crossarm of each of said T-shaped parts having supporting surfaces facing said side bars, said supporting surfaces engaging upon the two link pins connecting said chain link to the adjacent chain links so as to lock said link pins in fixed positions relative to said pressure member and said side bars.

16. A side-bar chain as defined in claim 15, in which each of said link pins in each of said second chain links is longitudinally divided and forms a pair of rocking members adapted to rock on each other, each of said supporting surfaces of said T-shaped parts engaging only upon a first of the two rocking members forming one of the link pins extending through said chain link at each side of said pressure member, so that only said first rocking members of said two link pins are locked in fixed positions relative to said pressure member of said chain link, said first rocking members of said two link pins being spaced at a greater distance than the second rocking members from the central arms of said T-shaped parts of said pressure member.

17. A side-bar chain as defined in claim 1, in which said locking means comprises a resilient striplike member adapted to be inserted into and to fill out a gap between said side bars and said pressure means and to exert a resilient pressure against said side bars and said pressure means.

18. A side-bar chain as defined in claim 17, in which said pressure means comprise a pressure member extending transversely through said side bars, said striplike member having a bifurcated extension on at least one end thereof, each of said link pins having an extension of a smaller cross section on at least one end thereof projecting from said side bars so as to form a shoulder between said link pin and said extension, the two arms of said bifurcated extension of said striplike member being adapted to embrace said pressure member and to engage upon said shoulder of each of said link pins.

19. A side-bar chain as defined in claim 17, in which said pressure means comprise a pressure member extending transversely through said side bars, each of said link pins extending through one of said chain links being longitudinal divided and forming two rocking members adapted to rock on each other and each having a recess in at least one outer end thereof, said striplike member having a bifurcated extension on at least one end thereof, the two arms of said bifurcated extension being adapted to embrace said pressure member and to engage into said recesses of the two rocking members of said two link pins which are located at a smaller distance from said pressure member than the two other rocking members.

20. In a side-bar chain for an infinitely variable cone pulley transmission having chain links each comprising a plurality of parallel side bars, link pins extending transversely through and pivotally connecting the adjacent chain links to each other, and pressure means comprising pressure members extending across and operatively engaged with each of the links for transmitting forces between the conical pulley discs of the transmission and the chain links, the improvement comprising said pressure members having grooves therein extending in the longitudinal direction of the chain, said side bars fitting in said grooves, and means carried by said pressure members for engaging the outer end portions of said pins to prevent sliding of the pins relative to the side bars.

References Cited

UNITED STATES PATENTS

| | | | |
|---|---|---|---|
| 1,673,950 | 6/1928 | Reeves | 74—236 |
| 1,691,871 | 11/1928 | Reeves | 74—235 |
| 2,913,916 | 11/1959 | Schmidt | 74—230.17 |
| 3,071,020 | 1/1963 | Maurer et al. | 74—236 |
| 3,089,346 | 5/1963 | Dittrich et al. | 74—236 |

FRED C. MATTERN, Jr., *Primary Examiner.*

J. A. WONG, *Assistant Examiner.*